(12) United States Patent
Furukawa (10) Patent No.: US 11,879,506 B2
(45) Date of Patent: Jan. 23, 2024

(54) COUPLING

(71) Applicant: EAGLE INDUSTRY CO., LTD., Tokyo (JP)

(72) Inventor: Yasunari Furukawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 382 days.

(21) Appl. No.: 17/258,669

(22) PCT Filed: Jul. 23, 2019

(86) PCT No.: PCT/JP2019/028864
§ 371 (c)(1),
(2) Date: Jan. 7, 2021

(87) PCT Pub. No.: WO2020/031686
PCT Pub. Date: Feb. 13, 2020

(65) Prior Publication Data
US 2021/0270327 A1    Sep. 2, 2021

(30) Foreign Application Priority Data
Aug. 9, 2018  (JP) .................................. 2018-150474

(51) Int. Cl.
*F16D 3/74* (2006.01)
*F16J 3/02* (2006.01)
(Continued)

(52) U.S. Cl.
CPC .................. *F16D 3/74* (2013.01); *F16D 3/79* (2013.01); *F16J 3/02* (2013.01); *F16J 15/06* (2013.01);
(Continued)

(58) Field of Classification Search
CPC ..... F16D 3/74; F16D 3/79; F16D 3/78; F16D 2200/0004; F16D 2300/0212;
(Continued)

(56) References Cited

U.S. PATENT DOCUMENTS 2,870,617 A   1/1959 Peters
3,368,369 A   2/1968 Kimmel
(Continued)

FOREIGN PATENT DOCUMENTS

CN    201351690 Y    11/2009
DE      3443485 A1     6/1986
(Continued)

OTHER PUBLICATIONS

Extended European Search Report dated Apr. 8, 2022 for corresponding EP Application No. 19846573.4 (8 pages).
(Continued)

*Primary Examiner* — Greg Binda
(74) *Attorney, Agent, or Firm* — Harness, Dickey & Pierce, P.L.C.

(57) ABSTRACT

A flexible unit absorbing misalignment and transmitting torque from a driving shaft to a driven shaft is provided between a pair of flanges individually provided on each of the driving shaft side and the driven shaft side, both the driving shaft and the driven shaft being hollow. A communication passage letting hollow regions of the driving shaft and the driven shaft communicate with each other to form a circulation space for a cooling fluid is provided in the flexible unit. The flow of the cooling fluid cooling a driving source driving and rotating the driving shaft from the inside is created in the circulation space. A seal portion seals between the circulation space and an outside space to prevent leakage of the cooling fluid from the circulation space to the outside space.

4 Claims, 6 Drawing Sheets

(51) Int. Cl.
*F16J 15/06* (2006.01)
*F16J 15/52* (2006.01)
*F16D 3/79* (2006.01)
*F16D 3/78* (2006.01)

(52) U.S. Cl.
CPC ............... *F16J 15/52* (2013.01); *F16D 3/78* (2013.01); *F16D 2200/0004* (2013.01); *F16D 2300/0212* (2013.01); *F16D 2300/0214* (2013.01)

(58) Field of Classification Search
CPC ...... F16D 2300/0214; F16J 3/02; F16J 15/06; F16J 15/52
USPC .............................................. 464/20, 98, 99
See application file for complete search history.

(56) References Cited

U.S. PATENT DOCUMENTS

| | | | | |
|---|---|---|---|---|
| 4,411,634 | A | * | 10/1983 | Hammelmann ......... F16D 3/74 464/99 |
| 4,708,692 | A | | 11/1987 | Weiss |
| 5,899,813 | A | | 5/1999 | Bunce |
| 2007/0049379 | A1 | | 3/2007 | Faass et al. |
| 2010/0093449 | A1 | | 4/2010 | Davies |

FOREIGN PATENT DOCUMENTS

| | | |
|---|---|---|
| DE | 102006004836 A1 | 5/2007 |
| EP | 1433970 A1 | 6/2004 |
| EP | 2110572 a1 | 10/2009 |
| GB | 594550 A | 11/1947 |
| JP | S48-19840 U | 3/1973 |
| JP | S61-192931 A | 8/1986 |
| JP | S62-59325 U | 4/1987 |
| JP | S62-143822 U | 9/1987 |
| JP | S63-018629 U | 2/1988 |
| JP | S64-048432 A | 2/1989 |
| JP | H01-119922 A | 5/1989 |
| JP | H01-91126 U | 6/1989 |
| JP | H01-118228 U | 8/1989 |
| JP | 2000-514160 A | 10/2000 |
| JP | 2010-519479 A | 6/2010 |
| JP | 2017-032081 A | 2/2017 |

OTHER PUBLICATIONS

International Search Report (English and Japanese) of the International Searching Authority issued in PCT/ JP2019/028864, dated Oct. 1, 2019; ISA/JP.

* cited by examiner

COUPLING

CROSS REFERENCE TO RELATED APPLICATIONS

This application is a U.S. National Phase application of International Application No. PCT/JP2019/028864, filed on Jul. 23, 2019, which claims priority to Japanese Patent Application No. 2018-150474, filed on Aug. 9, 2018. The entire disclosures of the above applications are expressly incorporated by reference herein.

BACKGROUND

Technical Field

The present disclosure relates to a coupling placed between two shafts and transmitting rotation torque.

Related Art

A coupling is placed between two shafts containing a driving shaft and a driven shaft, transmits rotation, and, at this time, absorbs misalignment between the two shafts. There are various types of such couplings. One of the couplings include diaphragm couplings described in Japanese Unexamined Utility Model Publication No. 64-048432 (Patent Document 1) and Japanese Unexamined Utility Model Publication No. 01-119922 (Patent Document 2).

In the diaphragm couplings described in Patent Documents 1 and 2, a center tube is disposed between a pair of flanges facing each other and the pair of flanges and the center tube are connected by diaphragms containing a metal thin plate. One of the pair of flanges is connected to a driving shaft and the other one is connected to a driven shaft. In the diaphragms, inner diameter portions thereof are fixed to both ends of the center tube and outer diameter portions are fixed to the flanges. To the flanges, guards are also fastened.

The diaphragm couplings described in Patent Documents 1 and 2 transmit rotation torque between the driving shaft and the driven shaft and, at this time, absorb misalignment, such as axial displacement, axis deviation, or angular displacement, by deformation of the diaphragms.

In recent years, a motor with a large capacity and a large output has been developed and put in practical use as a driving source of a system containing a diaphragm coupling. Such a motor has posed a problem of an output reduction due to generation of heat, and thus a countermeasure against the problem has been demanded.

In this respect, capability maintenance and improvement of the motor by cooling is confirmed, and therefore it is conceivable to cool the motor from the outside. However, with a technique of cooling the motor from the outside, high cooling efficiency is not expectable.

It is an object of the disclosure to efficiently cool a driving source of a system containing a diaphragm coupling.

SUMMARY

A coupling of the disclosure includes a pair of connection members individually provided on each of a side of a driving shaft and a side of a driven shaft, both the driving shaft and the driven shaft being hollow, a torque transmission portion placed between the pair of connection members, absorbing misalignment, and transmitting torque from the driving shaft to the driven shaft, a communication passage letting hollow regions of the driving shaft and the driven shaft communicate with each other to form a circulation space for a cooling fluid, and a seal portion sealing between the circulation space and an outside space.

Effect

The disclosure can let the cooling fluid flow from the driven shaft to the driving shaft, and therefore can efficiently cool a driving source.

DETAILED DESCRIPTION

Some embodiments are described. All of the embodiments are application examples to diaphragm couplings.

First Embodiment

Figure 1:
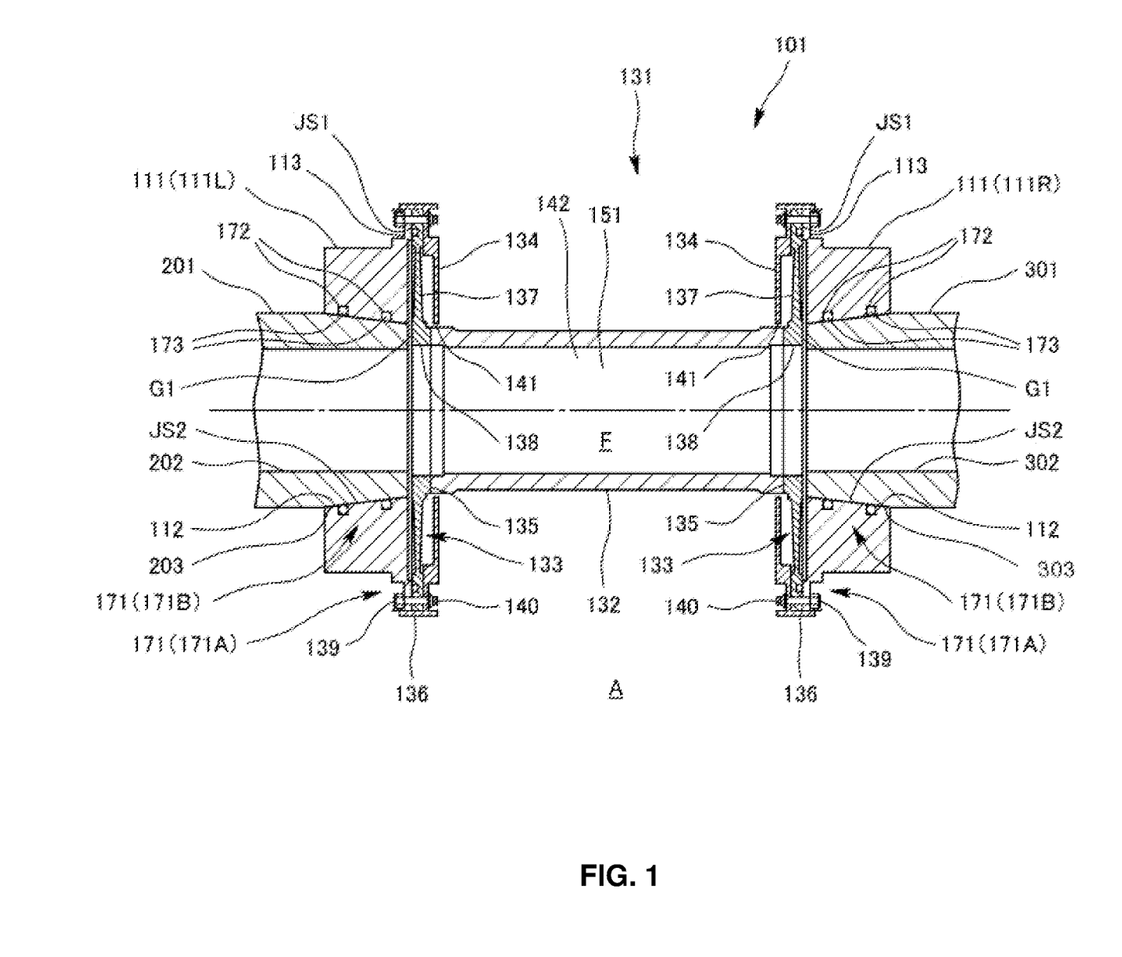
FIG. 1 is a vertical cross-sectional view of a diaphragm coupling illustrating one embodiment.
Figure 2A:
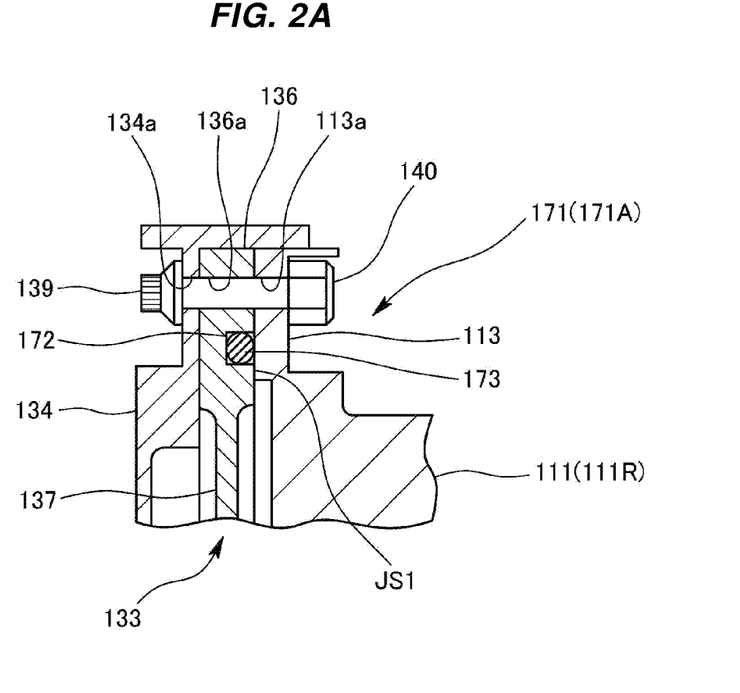
FIG. 2A is a vertical cross-sectional view illustrating an outer periphery side seal portion in an enlarged manner and FIG. 2B is a vertical cross-sectional view illustrating an inner periphery side seal portion in an enlarged manner.
Figure 2B:
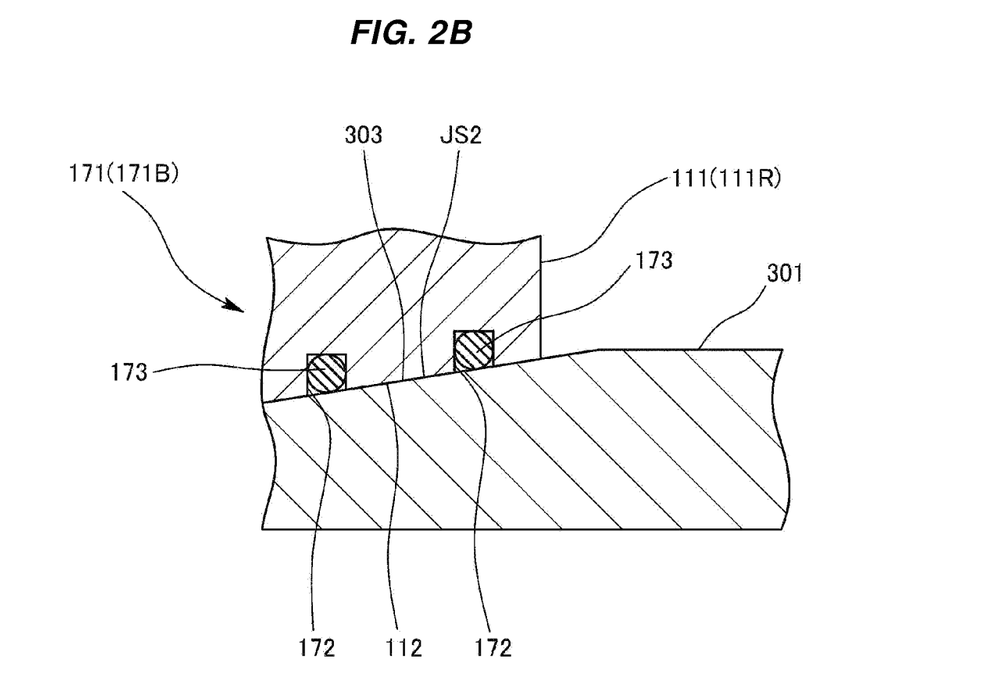

A first embodiment is described based on FIG. 1 and FIG. 2A, FIG. 2B. A diaphragm coupling 101 of this embodiment is placed between two shafts containing a driving shaft 201 and a driven shaft 301, transmits rotation torque from the driving shaft 201 to the driven shaft 301, and, at this time, absorbs misalignment between the driving shaft 201 and the driven shaft 301. The driving shaft 201 is driven and rotated using a motor which is not illustrated as a driving source, for example.

As illustrated in FIG. 1, both the driving shaft 201 and the driven shaft 301 are metal members having hollow structures of having inner holes 202, 302, respectively. The inner holes 202, 302 are provided coaxially with the driving shaft 201 and the driven shaft 301, respectively, and have a straight shape in which the diameter does not change. On the other hand, both the outer peripheral surfaces on the end sides of the driving shaft 201 and the driven shaft 301 connected to the diaphragm coupling 101 are inclined surfaces 203, 303, respectively, and are imparted with a tapered shape in which the diameter reduces toward the tip.

The diaphragm coupling 101 includes a flexible unit 131 as a torque transmission portion between a pair of flanges 111 as connection members coaxially facing each other.

Both the pair of flanges 111, i.e., one flange 111L (left side in FIG. 1) and the other flange 111R, are metal members of an annular shape and have connection holes 112 coaxially located in the center. The connection holes 112 fit the driving shaft 201 and the driven shaft 301 to each other and connect and fix the flanges 111 to the driving shaft 201 and the driven shaft 301. Therefore, the inner walls of the connection holes 112 are imparted with a tapered shape in which the diameter increases toward the outside so as to be matched with the outer shapes of the inclined surfaces 203, 303 of the driving shaft 201 and the driven shaft 301, respectively.

The connection and the fixation between the driving shaft 201 and the flange 111L and between the driven shaft 301 and the flange 111R which are fitted to each other are achieved by hydraulic fit as an example. More specifically, hydraulic is applied to the flanges 111L, 111R to expand the hole size of the connection holes 112 of the flanges 111L, 111R, the driving shaft 201 and the driven shaft 301 are inserted into the connection holes 112, and then the hydraulic is released. Thus, the hole size of the connection holes 112 returns, so that the driving shaft 201 and the flange 111L and the driven shaft 301 and the flange 111R are connected and fixed to each other. At this time, taper fit arises in which the tapered shapes imparted to the outer shapes of both the members are fitted to each other. In addition thereto, the connection and the fixation between the driving shaft 201 and the driven shaft 301 and the flanges 111 which are fitted to each other may be realized by any means insofar as the connection strength is maintained.

The pair of flanges 111 (111L, 111R) connected and fixed to the driving shaft 201 and the driven shaft 301, respectively, as described above is integrally provided with attachment pieces 113 of a collar shape from an outer periphery on one end side serving as the tip of the driving shaft 201 and the driven shaft 301. The attachment pieces 113 are used to fix the flexible unit 131.

The flexible unit 131 contains a center tube 132, diaphragms 133, and guards 134.

The center tube 132 is a hollow metal member of a cylindrical shape, located between the pair of flanges 111 (111L, 111R), and disposed coaxially with these flanges 111. Such arrangement of the center tube 132 is realized by the diaphragms 133 forming a pair.

The diaphragm 133 is a disk-like metal member provided with a deflection portion 137 between an inner diameter portion 135 and an outer diameter portion 136 and has an opening 138 in the center. Therefore, a portion continuous to the opening 138 is the inner diameter portion 135. The deflection portion 137 is formed to be thinner than the inner diameter portion 135 and the outer diameter portion 136 and deflects when axial displacement, axis deviation, angular displacement, or the like arises between the outer diameter portion 136 and the inner diameter portion 135.

In the diaphragms 133, the inner diameter portions 135 are integrally fixed to both the ends of the center tube 132 and the outer diameter portions 136 are tightened and fixed to the pair of flanges 111. More specifically, the diaphragms 133 are coaxially fixed to the center tube 132 by joining the inner diameter portions 135 to both the ends of the center tube 132. At this time, the center tube 132 and the inner diameter portions 135 of the diaphragms 133 are rigidly fixed to be airtightly integrated. The diaphragms 133 also tighten and fix the outer diameter portions 136 and the attachment pieces 113 provided in the pair of flanges 111 by penetrating bolts 139 through the outer diameter portions 136 and the attachment pieces 113 and tightening the same with nuts 140. Due to the above-described structure, a plurality of bolt holes 136a, 113a is arranged at fixed intervals in the outer diameter portions 136 of the diaphragms 133 and the attachment pieces 113 of the flanges 111, respectively.

The guard 134 is a plate-like member having an opening 141 having a diameter slightly larger than the diameter of the center tube 132 in the center. In a state where the center tube 132 is inserted into the openings 141, the guards 134 are disposed inside the pair of diaphragms 133.

The guards 134 are fixed to the flanges 111 together with the pair of diaphragms 133. More specifically, bolt holes 134a are also provided in the guards 134 while being positioned with the plurality of bolt holes 136a, 113a provided in the outer diameter portions 136 of the diaphragms 133 and the attachment pieces 113 of the flanges 111, respectively. The guards 134 are fastened to the flanges 111 with the bolts 139 and the nuts 140 together with the diaphragms 133 utilizing the bolt holes 134a to be fixed to the flanges 111.

In the guards 134 fixed to the pair of flanges 111 together with the pair of diaphragms 133 as described above, the edges of the openings 141 are made to face the center tube 132 with a gap. Therefore, when the deflection portions 137 of the diaphragms 133 deflect to a certain degree or more, the guards 134 let the edges of the openings 141 abut on the center tube 132 to protect the deflection portions 137 from excessive deformation. In the unlikely event that the diaphragms 133 are damaged due to an overload, the guards 134 suppress the swing of the center tube 132 to prevent the projection thereof.

As illustrated in FIG. 1, in the assembled diaphragm coupling 101, gaps G1 are opened between the driving shaft 201 and the flange 111L and the diaphragm 133 joined to the driving shaft 201 and between the driven shaft 301 and the flange 111R and the diaphragm 133 joined to the driven shaft 301. The gaps G1 are opened in order to deflect the diaphragms 133 in the axis direction.

The diaphragm coupling 101 of this embodiment includes a communication passage 151. The communication passage 151 lets hollow regions formed by the inner holes 202, 302 of the driving shaft 201 and the driven shaft 301, respectively, communicate with each other to form a circulation space F for the cooling fluid from the inner hole 302 of the driven shaft 301 to the inner hole 202 of the driving shaft 201.

The communication passage 151 is formed by the inner hole 142 of the center tube 132 and the openings 138 of the diaphragms 133. The inner hole 142 of the center tube 132 has a diameter substantially equal to the diameters of the inner hole 202 of the driving shaft 201 and the inner hole 302 of the driven shaft 301 and has a straight shape in which the diameter does not change except that only both the ends have a slightly larger diameter. The openings 138 of the diaphragms 133 have diameters substantially equal to the diameters of both the ends of the inner hole 142 of the center tube 132 in which the diameter is slightly larger than the diameter of the other regions.

Hence, the diaphragm coupling 101 and the driving shaft 201 and the driven shaft 301 internally communicate with each other by the communication passage 151 and the inner holes 202, 302 having diameters substantially equal to each other to form the circulation space F circulating the cooling fluid, e.g., cooling water, in an internal space.

As illustrated in FIG. 1 and FIG. 2A, FIG. 2B, the diaphragm coupling 101 includes seal portions 171 sealing between the circulation space F and an outside space A to prevent the leakage of the cooling fluid from the circulation space F. The seal portions 171 are provided in two different types of regions.

One type of the region of the two types of regions where the seal portions 171 are provided is a joint surface JS1 where the outer diameter portion 136 of each of the pair of diaphragms 133 and the attachment piece 113 of each of the pair of flanges 111 (111L, 111R) are joined to each other. The joint surfaces JS1 are provided on the diaphragm 133 side and the flange 111 side but, for convenience of description, the joint surfaces JS1 are simply referred to insofar as the surfaces where the joint surfaces JS1 are provided do not matter. Similarly, for convenience of description, the seal portion 171 provided on the joint surface JS1 is referred to as an "outer periphery side seal portion 171A" in this embodiment.

The other type of region of the two types of regions where the seal portions 171 are provided is a joint surface JS2 where the driving shaft 201 or the driven shaft 301 and the flange are joined to each other, i.e., joint surfaces JS2 where the driving shaft 201 and one flange 111L are joined to each other and the driven shaft 301 and the other flange 111R are joined to each other. For convenience of description, the joint surfaces JS2 are simply referred to insofar as the surfaces where the joint surfaces JS2 are provided do not matter. Similarly, for convenience of description, the seal portion 171 provided on the joint surface JS2 is referred to as an "inner periphery side seal portion 171B" in this embodiment.

The seal portions 171 seal the circulation space F and the outside space A using grooves 172 and O-rings 173. The O-ring 173 has a cross section of a perfect circle shape. The diameter is set to be larger than the depth of the groove 172. A portion exceeding the depth dimension of the groove 172 serves as a crushing margin. The O-rings 173 seal two members by the crushing margin. The above-described basic structure as the seal portion 171 is common to the outer periphery side seal portions 171A and the inner periphery side seal portions 171B.

The outer periphery side seal portions 171A are provided with the grooves 172 and the O-rings 173 in the joint surfaces JS1 between the pair of diaphragms 133 and the pair of flanges 111 (111L, 111R). The grooves 172 are molded into an endless shape in the joint surfaces JS1 on the sides of the outer diameter portions 136 of the diaphragms 133 and the O-rings 173 are housed in the grooves 172. Hence, when the diaphragms 133 and the flanges 111 are joined to each other by being tightened with the bolts 139 and the nuts 140, the O-rings 173 are crushed by the joint surfaces JS1 on the sides of the attachment pieces 113 of the flanges 111 to be brought into close contact with the joint surfaces JS1 to exhibit a seal action.

The inner periphery side seal portions 171B are provided with the grooves 172 and the O-rings 173 in the joint surface JS2 between the driving shaft 201 and one flange 111L and the joint surface JS2 between the driven shaft 301 and the other flange 111R. Two lines of the grooves 172 are molded into an endless shape in the joint surfaces JS2 on the sides of the inclined surfaces 203, 303 and the O-rings 173 are housed in the two lines of grooves 172. Hence, when one flange 111L is joined to the driving shaft 201 and the other flange 111R is joined to the driven shaft 301, the O-rings 173 are crushed by the joint surfaces JS2 on the sides of the inclined surfaces 203, 303 of the flanges 111 to be brought into close contact with the joint surfaces JS2 to exhibit a seal action.

In such a configuration, the diaphragm coupling 101 is mounted between the driving shaft 201 and the driven shaft 301 arranged on a straight line and transmits rotation torque from the driving shaft 201 to the driven shaft 301. In that case, the rotation torque from the driving shaft 201 is transmitted to the driven shaft 301 by being transmitted from the flange 111L on the driving shaft 201 side to the diaphragm 133 and the center tube 132, and then transmitted from the diaphragm 133 on the opposite side to the flange 111R on the driven shaft 301 side.

In the above-described transmission of the rotation torque, the diaphragm coupling 101 absorbs misalignment, such as axial displacement, axis deviation, or angular displacement, arising between the driving shaft 201 and the driven shaft 301.

In this embodiment, the circulation space F for the cooling fluid is provided which reaches the inner hole 202 of the driving shaft 201 through the communication passage 151 of the diaphragm coupling 101 from the inner hole 302 of the driven shaft 301. Thus, it is possible to cool a driving source, which is not illustrated, e.g., a motor or a turbine, of the driving shaft 201 by letting the cooling fluid, e.g., cooling water, flow in the circulation space F.

In order to let the cooling fluid flow in the circulation space F, a circulating pump which is not illustrated is disposed in the end of the driven shaft 301, and then the circulating pump is operated to forcibly generate a stream toward the driving shaft 201 side as an example. This enables the cooling water to flow to the inner hole 202 of the driving shaft 201 built in the motor, so that the motor can be efficiently cooled.

As described above, the gaps G1 are provided between the driving shaft 201 and the flange 111R and the diaphragm 133 joined to the driving shaft 201 and between the driven shaft 301 and the flange 111L and the diaphragm 133 joined to the driven shaft 301. While the gaps G1 are indispensable for deflecting the diaphragms 133 in the axis direction to absorb the misalignment, such as axial displacement between the driving shaft 201 and the driven shaft 301, the gaps G1 allow the entry of the cooling fluid when the cooling fluid is circulated in the circulation space F.

The cooling fluid entering the gaps G1 permeates into the joint surfaces JS1, JS2. Therefore, there is a possibility that the cooling fluid permeating into the joint surfaces JS1, JS2 leaks to the outside space A. Hence, in this embodiment, the outer periphery side seal portion 171A and the inner periphery side seal portion 171B are provided in each of the joint surfaces JS1, JS2. The seal portions 171 (171A, 171B) maintain the airtightness of the circulation space F by the close contact between the O-rings 173 and the joint surfaces JS1, JS2. Hence, this embodiment can prevent the leakage of the cooling fluid to the outside space A. As a result, the adhesion of the fluid to electric components, such as a motor, wiring of the electric components, and the like is prevented, and thus drawbacks when an electric system gets wet with the fluid can be avoided.

According to this embodiment, the outer periphery side seal portions 171A of the seal portions 171 include the endless grooves 172 provided in the joint surfaces JS1 between the outer diameter portions 136 of the pair of diaphragms 133 and the pair of flanges 111 (111L, 111R) and the O-rings 173 housed in the grooves 172. Hence, the seal portions 171 can be realized at a low cost by the simple structure.

According to this embodiment, sets of the driving shaft 201 and the driven shaft 301 and the pair of flanges 111 (111L, 111R) forming a set with the driving shaft 201 and the driven shaft 301, respectively, are integrated by the surface joining between separate components. More specifically, the driving shaft 201 and the one flange 111L are separate components and are integrated by the surface joining by the joint surface JS1. The driven shaft 301 and the other flange 111R are separate components and are integrated by the surface joining with by joint surface JS1.

With the above-described structure, the inner periphery side seal portion 171B of the seal portions 171 includes the endless grooves 172 provided in each of the joint surfaces of two members of each set integrated by the surface joining between the separate components, i.e., the joint surface JS2 between the driving shaft 201 and the one flange 111L and the joint surface JS2 between the driven shaft 301 and the other flange 111R, and the O-rings 173 housed in the grooves 172. Hence, the seal portions 171 can be realized at a low cost by the simple structure.

The flexible unit 131 of this embodiment includes the center tube 132 and includes the pair of diaphragms 133 having the inner diameter portions 135 integrally fixed to both the ends of the center tube 132 and the outer diameter portions 136 tightened and fixed to the pair of flanges 111 (111L, 111R) and provided with the deflection portions 137 between the inner diameter portions 135 and the outer diameter portions 136. The communication passage 151 is formed by the inner hole 142 of the center tube 132 and the openings 138 provided in the diaphragms 133. Hence, the communication passage 151 can be easily provided utilizing the original structure of the flexible unit 131.

Second Embodiment

Figure 3:
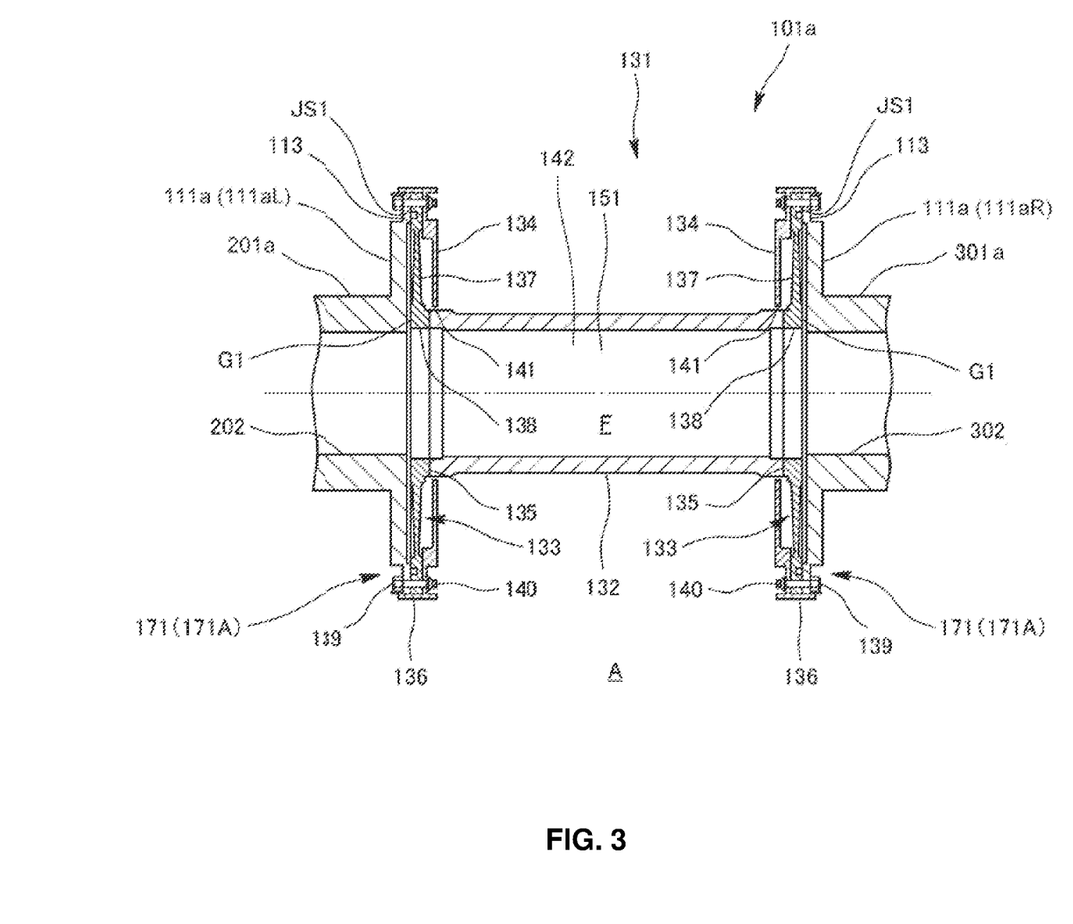
FIG. 3 is a vertical cross-sectional view of a diaphragm coupling illustrating another embodiment.

A second embodiment of a diaphragm coupling 101a is described based on FIG. 3. The same parts as those in the first embodiment are designated by the same reference numerals and descriptions thereof are also omitted.

This embodiment is a configuration example in which, with respect to both the set of the driving shaft 201a and the one flange 111aL and the set of the driven shaft 301a and the other flange 111aR, the two members are integrally molded.

As an example, the driving shaft 201a and the one flange 111aL are integrally molded by cold forging.

As another example, the driving shaft 201a and the one flange 111aL are manufactured as an integrated component by joining a metal annular member having a disk shape to the ends of a metal pipe-like member. The same applies to the driven shaft 301a and the other flange 111aR. The joining between the pipe-like member and the annular member is achieved by welding, for example.

Hence, the cooling fluid does not permeate between the driving shaft 201a and the one flange 111aL and between the driven shaft 301a and the other flange 111aR. Therefore, the inner periphery side seal portions 171B are unnecessary, and thus the diaphragm coupling 101a is not provided with the inner periphery side seal portions 171B.

In such a configuration, the diaphragm coupling 101a of this embodiment exhibits the same operational effects as those in the first embodiment. In addition thereto, the inner periphery side seal portions 171B can be omitted, and therefore the number of components and the number of manufacturing steps can be reduced.

Third Embodiment

Figure 4:
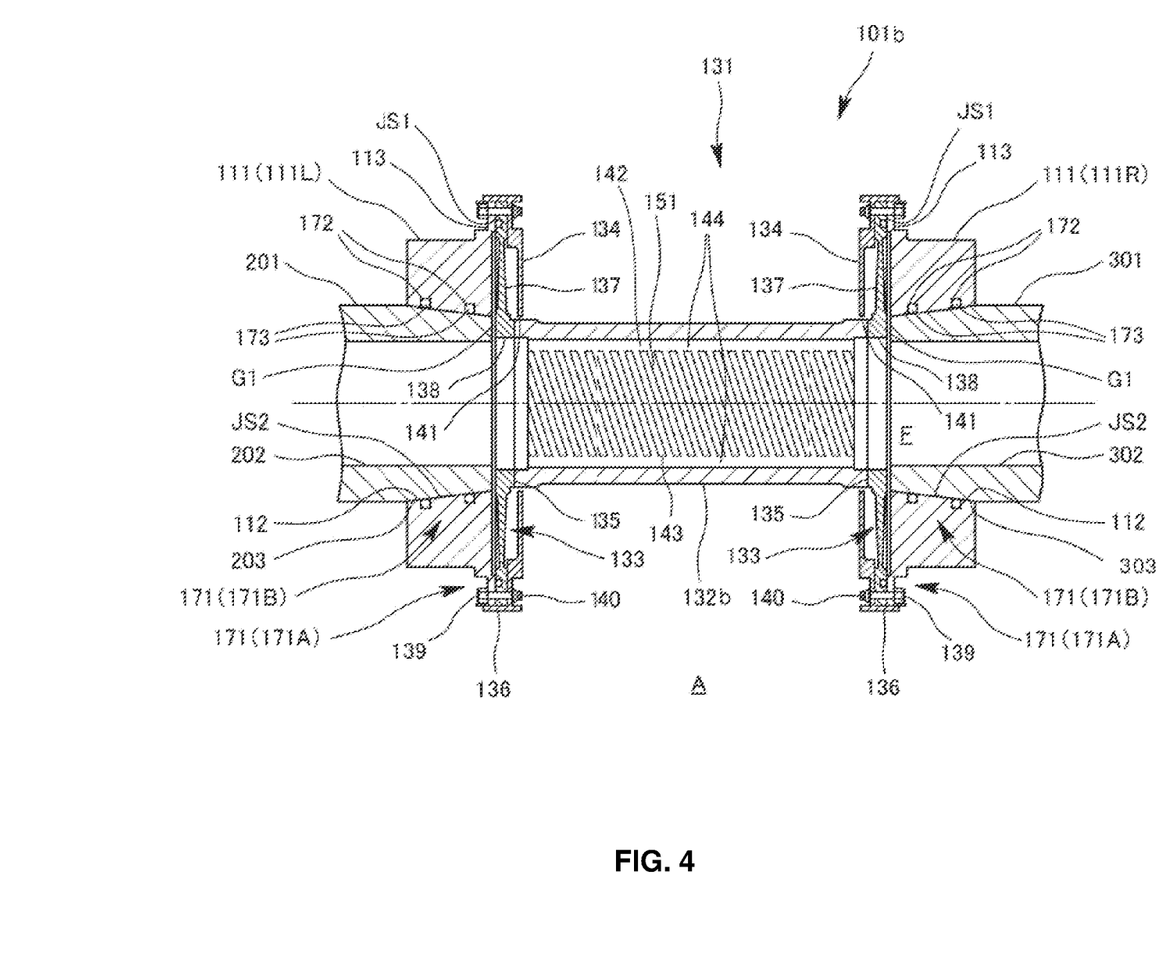
FIG. 4 is a vertical cross-sectional view of a diaphragm coupling illustrating another embodiment.

A third embodiment of a diaphragm coupling 101b is described based on FIG. 4. The same parts as those in the first embodiment are designated by the same reference numerals and descriptions thereof are also omitted.

This embodiment is a configuration example in which irregularities 143 generating a pumping action are provided in the inner peripheral surface of the center tube 132b. The irregularities 143 are disposed on a spiral locus and generate the pumping action of transferring the cooling fluid to a hollow region formed by the inner hole 202 of the driving shaft 201 by the rotation of the center tube 132.

In this embodiment, the irregularities 143 are not continuously provided over the entire spiral locus and are intermittently provided. More specifically, the irregular shape of the irregularities 143 is broken by a plurality of liens of smooth surfaces 144 extending in the axis direction to form intermittent shapes.

The irregularities 143 provided in the inner peripheral surface of the center tube 132b can be molded by projections as an example or can be molded by recessed grooves as another example. When the irregularities 143 are molded by projections, the original inner peripheral surfaces of the center tube 132b located between adjacent projections form recessed grooves. When the irregularities 143 are molded by recessed grooves, the original inner peripheral surfaces of the center tube 132b located between adjacent recessed grooves form projections. Hence, even in a case of any configuration example, the irregularities 143 impart an irregular shape to the inner peripheral surface of the center tube 132b.

The spiral locus where the irregularities 143 are molded have a direction of advancing counterclockwise toward the driving shaft 201 side as viewed from the driven shaft 301 side. Hence, when the center tube 132b is rotated following a clockwise rotation of the driving shaft 201, the pumping action in which the cooling fluid is transferred from the driven shaft 301 side to the driving shaft 201 side is generated.

In such a configuration, the pumping action generates by the rotation of the center tube 132b, and therefore the cooling fluid is transferred from the driven shaft 301 side to the driving shaft 201 side. Therefore, a driving source for letting the cooling fluid flow in the circulation space F, e.g., a circulating pump, can be omitted. Or, even when the circulating pump is provided, the size of the circulating pump can be reduced by reducing the capacity of the circulating pump.

Fourth Embodiment

Figure 5:
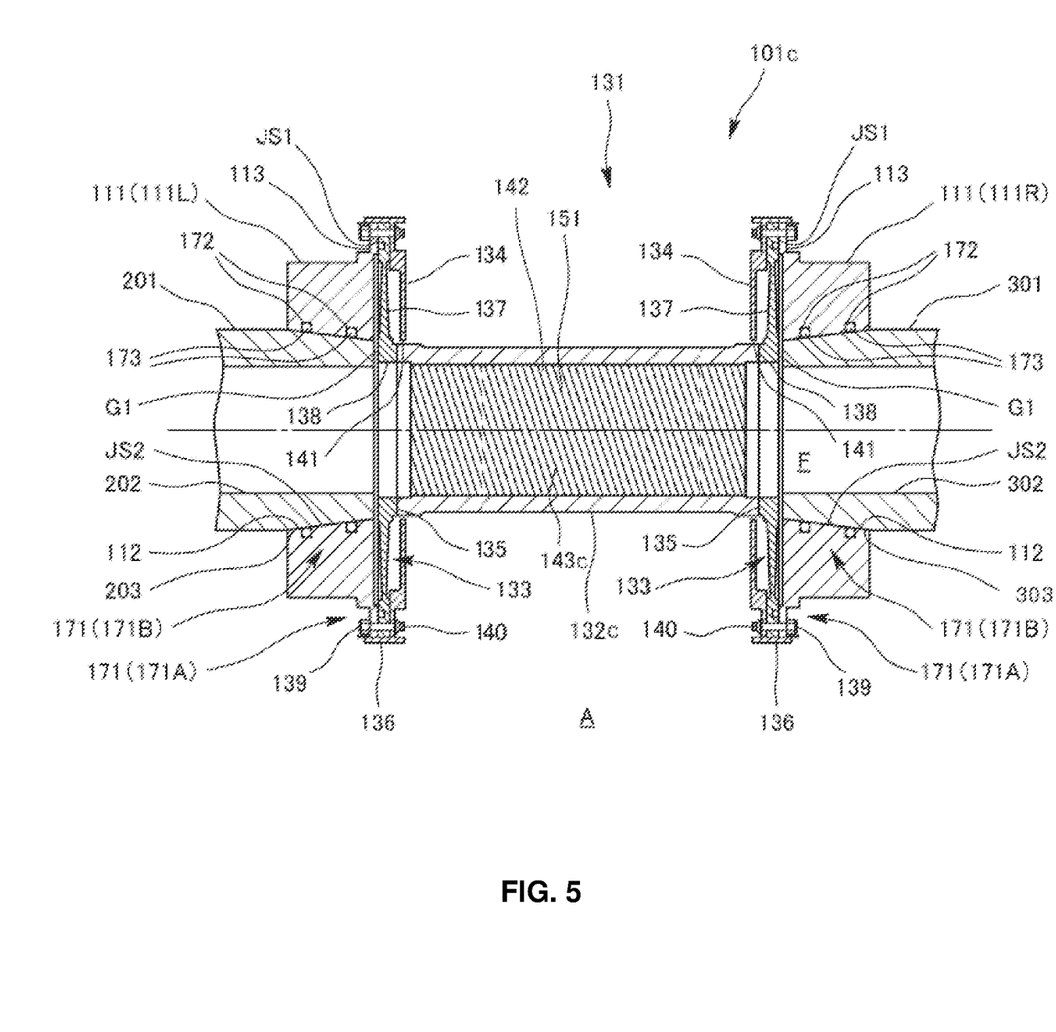
FIG. 5 is a vertical cross-sectional view of a diaphragm coupling illustrating another embodiment.

A fourth embodiment of a diaphragm coupling 101c is described based on FIG. 5. The same parts as those in the third embodiment are designated by the same reference numerals and descriptions thereof are also omitted.

This embodiment is a configuration example in which the irregularities 143c generating a pumping action are provided in the inner peripheral surface of the center tube 132c as with the third embodiment. This embodiment is different from the third embodiment in that the irregularities 143c are continuously provided over the entire spiral locus. Hence, the irregularities 143c have a spiral screw shape.

In such a configuration, the pumping action generated by the rotation of the center tube 132c is stronger than that in the third embodiment when the basic shapes, such as the width, depth, and spiral angle, of the irregularities 143c are the same. Hence, the flow of the cooling fluid in the circulation space F can be more efficiently generated.

Fifth Embodiment

Figure 6:
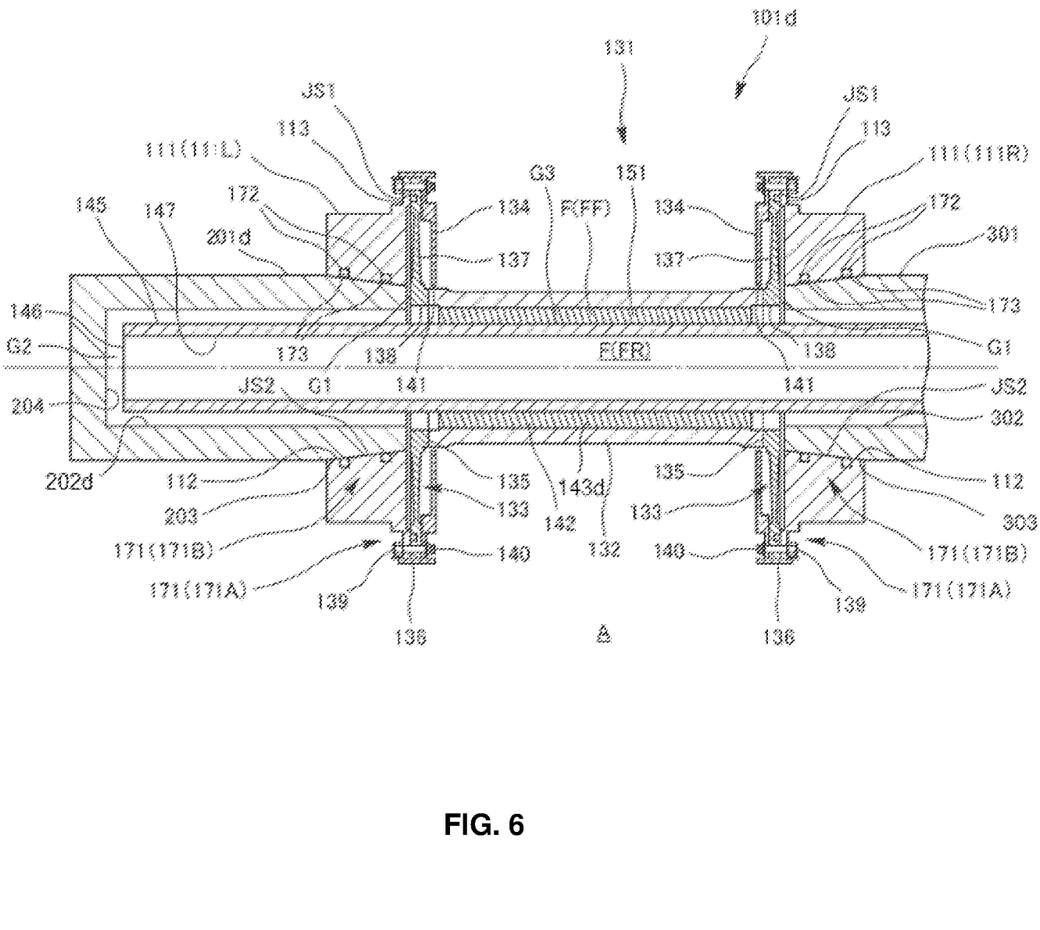
FIG. 6 is a vertical cross-sectional view of a diaphragm coupling illustrating a still another embodiment.

A fifth embodiment of a diaphragm coupling 101d is described based on FIG. 6. The same parts as those in the fourth embodiment are designated by the same reference numerals and descriptions thereof are also omitted.

This embodiment is a configuration example in which the hollow region of the driving shaft 201d has a dead end and a hollow shaft 145 is disposed in the circulation space F on the assumption that the end of the hollow region is a closure wall 204. The hollow shaft 145 is a hollow shaft in which both the ends are opened, in which an opening 146 on one end side is made to face the closure wall 204 with a gap G2 in the hollow region of the driving shaft 201, which is disposed in the communication passage 151 of the diaphragm coupling 101, and in which the other end extends to the hollow region of the driven shaft 301.

The hollow shaft 145 divides the inside of the circulation space F into two parts and creates a forward passage FF and a backward passage FR. More specifically, the forward passage FF is formed in a gap G3 in the inner hole 202$d$ of the driving shaft 201$d$ and the communication passage 151 of the diaphragm coupling 101 and between the inner peripheral wall of the inner hole 302 of the driven shaft 301 and the outer peripheral surface of the hollow shaft 145 in the circulation space F. The backward passage FR is formed by an inner hole 147 of the hollow shaft 145.

In such a configuration, when the driving shaft 201$d$ rotates, the flow of a fluid is generated in the forward passage FF in the circulation space F by the pumping action due to the irregularities 143$d$. Thus, the cooling fluid is transferred in the forward passage FF toward the driving shaft 201$d$ side from the driven shaft 301 side. The transferred cooling fluid hits against the closure wall 204 to change the movement direction, and then transferred in the backward passage FR. Thus, the cooling fluid circulates from the forward passage FF to the backward passage FR to cool a driving source which is not illustrated, e.g., a motor or a turbine, on the driving shaft 201 side.

Therefore, this embodiment can let the cooling fluid circulate in the circulation space F even when the circulation space F on the driving shaft 201$d$ side has a dead end.

Modification

In the implementation, various modifications or alternations can be made.

For example, although each embodiment described above gives the example in which the sets of the driving shaft 201 and the driven shaft 301 and the pair of flanges 111 (111L, 111R) forming a set with the driving shaft 201 and the driven shaft 301, respectively, are integrated by the surface joining between separate components, the configuration may not be limited thereto in the implementation. Either the set of the driving shaft 201 and the one flange 111L or the set of the driven shaft 301 and the other flange 111R may be integrated by surface joining between separate components.

In this embodiment, although cooling water is given as an example of the cooling fluid, various kinds of cooling fluids, such as oil and gas, can be used without being necessarily limited thereto in the implementation.

In addition thereto, various modifications or alternations are permitted in the implementation.

The invention claimed is:

1. A coupling comprising:
a pair of connection members individually provided on each of a side of a driving shaft and a side of a driven shaft, both the driving shaft and the driven shaft being hollow;
a torque transmission portion placed between the pair of connection members, absorbing misalignment, and transmitting torque from the driving shaft to the driven shaft;
a communication passage letting hollow regions of the driving shaft and the driven shaft communicate with each other to form a circulation space for a cooling fluid; and
a seal portion sealing between the circulation space and an outside space,
wherein the torque transmission portion includes:
a center tube; and
a pair of diaphragms each having an inner diameter portion integrally fixed to both ends of the center tube and an outer diameter portion tightened and fixed to each of the pair of connection members and provided with a deflection portion between the inner diameter portion and the outer diameter portion,
the communication passage is formed by an inner hole of the center tube and an opening provided in each of the diaphragms, and
the seal portion includes an endless groove provided in each of joint surfaces between the outer diameter portions of the pair of diaphragms and the pair of connection members and an O-ring housed in each of the grooves.

2. The coupling according to claim 1, wherein
at least one of sets of the driving shaft and the driven shaft and the pair of connection members forming a set with the driving shaft and the driven shaft is integrated by surface joining between separate components, and
the seal portion includes an endless groove provided in a joint surface of one of the two members of a set integrated by the surface joining between the separate components and an O-ring is housed in the endless groove.

3. The coupling according to claim 1, wherein
at least one of sets of the driving shaft and the driven shaft and the pair of connection members forming a pair with the driving shaft and the driven shaft is integrally molded.

4. The coupling according to claim 1, wherein
in an inner peripheral surface of the center tube, irregularities disposed on a spiral locus and generating a pumping action of transferring a cooling fluid to a side of the hollow region of the driving shaft by rotation of the center tube are provided.

* * * * *